(12) United States Patent
Miyakoshi et al.

(10) Patent No.: US 9,944,256 B2
(45) Date of Patent: Apr. 17, 2018

(54) VEHICLE AIR CONDITIONER WITH A CONTROLLER FOR JUDGING FROST FORMATION

(71) Applicant: Sanden Holdings Corporation, Isesaki-shi, Gunma (JP)

(72) Inventors: Ryo Miyakoshi, Isesaki (JP); Kenichi Suzuki, Isesaki (JP); Hidenori Takei, Isesaki (JP); Kouhei Yamashita, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 300 days.

(21) Appl. No.: 14/441,319

(22) PCT Filed: Nov. 11, 2013

(86) PCT No.: PCT/JP2013/080476
§ 371 (c)(1),
(2) Date: May 7, 2015

(87) PCT Pub. No.: WO2014/073691
PCT Pub. Date: May 15, 2014

(65) Prior Publication Data
US 2015/0283978 A1   Oct. 8, 2015

(30) Foreign Application Priority Data
Nov. 9, 2012 (JP) .................. 2012-247524

(51) Int. Cl.
*F25D 21/02* (2006.01)
*B60S 1/66* (2006.01)
(Continued)

(52) U.S. Cl.
CPC ............ *B60S 1/66* (2013.01); *B60H 1/00921* (2013.01); *B60H 1/00978* (2013.01); *F25B 5/04* (2013.01);
(Continued)

(58) Field of Classification Search
CPC ............ B60H 1/00921; B60H 1/00035; B60H 1/3204; B60H 1/3207; B60H 1/3213;
(Continued)

(56) References Cited

U.S. PATENT DOCUMENTS 6,347,528 B1 * 2/2002 Iritani ................ B60H 1/00357
62/323.1
9,643,470 B2 * 5/2017 Suzuki ............... B60H 1/00921
(Continued)

FOREIGN PATENT DOCUMENTS

EP   2 157 380 A1   2/2010
JP   2007-225158 A   9/2007
(Continued)

OTHER PUBLICATIONS

The State Intellectual Propery Office of People's Republic of China; The First Office Action issued in Chinese Patent Application No. 201380058556.X, dated Jun. 3, 2016.
(Continued)

*Primary Examiner* — Ljiljana Ciric
(74) *Attorney, Agent, or Firm* — Baker Botts L.L.P.

(57) ABSTRACT

A vehicle air conditioner which improves the frost formation judging precision of an outdoor heat exchanger, acquires the heating performance, and avoids unnecessary defrosting. A controller executes a heating mode. The controller (32) judges frost formation onto the outdoor heat exchanger (7) on the basis of a refrigerant evaporation pressure PXO of the outdoor heat exchanger (7) and a refrigerant evaporation pressure PXObase of the outdoor heat exchanger (7) during
(Continued)

non-frost formation or on the basis of a refrigerant evaporation temperature TXO of the outdoor heat exchanger (7) and a refrigerant evaporation temperature TXObase of the outdoor heat exchanger (7) during the non-frost formation, and allows a high-temperature refrigerant gas to flow through the outdoor heat exchanger (7), thereby performing defrosting of the outdoor heat exchanger (7).

20 Claims, 8 Drawing Sheets

(51) Int. Cl.
F25B 47/02 (2006.01)
B60H 1/00 (2006.01)
F25B 5/04 (2006.01)
F25B 6/04 (2006.01)
F25B 47/00 (2006.01)
F25B 49/02 (2006.01)
F25B 40/00 (2006.01)

(52) U.S. Cl.
CPC .............. *F25B 6/04* (2013.01); *F25B 47/006* (2013.01); *F25B 47/022* (2013.01); *F25B 49/022* (2013.01); *B60H 2001/00957* (2013.01); *F25B 40/00* (2013.01); *F25B 2341/0662* (2013.01); *F25B 2347/023* (2013.01); *F25B 2700/02* (2013.01); *F25B 2700/1933* (2013.01); *F25B 2700/2106* (2013.01); *F25B 2700/21161* (2013.01); *F25B 2700/21171* (2013.01)

(58) Field of Classification Search
CPC ...... B60H 1/00978; B60H 2001/00957; F25B 5/04; F25B 6/04; F25B 47/006; F25B 47/022; F25B 49/022
USPC .......................................................... 62/160
See application file for complete search history.

(56) References Cited

U.S. PATENT DOCUMENTS

| 2006/0266072 | A1* | 11/2006 | Takeuchi | F25B 40/00 62/500 |
| 2007/0289318 | A1* | 12/2007 | Nakamura | F25B 5/00 62/150 |
| 2012/0060538 | A1* | 3/2012 | Saito | F24H 4/02 62/324.1 |
| 2012/0255319 | A1* | 10/2012 | Itoh | F24F 3/1405 62/160 |
| 2015/0260439 | A1* | 9/2015 | Ohta | F25B 5/00 62/196.1 |
| 2015/0314668 | A1* | 11/2015 | Suzuki | F25B 1/10 62/160 |
| 2016/0084555 | A1* | 3/2016 | Suzuki | F25B 47/02 62/151 |
| 2017/0151857 | A1* | 6/2017 | Suzuki | B60H 1/00921 |
| 2017/0158022 | A1* | 6/2017 | Kim | B60H 1/00921 |

FOREIGN PATENT DOCUMENTS

| JP | 2011-127853 A | 6/2011 |
| JP | 2012-176660 A | 9/2012 |
| WO | 2009/093297 A1 | 7/2009 |
| WO | 2012/098966 A1 | 7/2012 |

OTHER PUBLICATIONS

German Patent and Trade Mark Office; Office Action issued in Application No. DE 11 2013 005 367.5, dated Jan. 5, 2017.
Japan Patent Office, International Search Report for Application No. PCT/JP2013/080476, dated Jan. 28, 2014.
Japan Patent Office; Notification of Reasons for Refusal issued in Japanese Patent Application No. 2012-247524, dated Aug. 17, 2016.
The State Intellectual Property Office of the People's Republic of China, The Second Office Action issued in Application No. CN 201380058556.X, dated Jan. 24, 2017.

* cited by examiner

US 9,944,256 B2

VEHICLE AIR CONDITIONER WITH A CONTROLLER FOR JUDGING FROST FORMATION

CROSS-REFERENCE TO RELATED APPLICATIONS

This application is a U.S. National Stage Patent Application under 37 U.S.C. § 371 of International Patent Application No. PCT/JP2013/080476, filed on Nov. 11, 2013, which claims the benefit of Japanese Patent Application No. JP 2012-247524, filed on Nov. 9, 2012, the disclosures of which are incorporated herein by reference in their entirety.

TECHNICAL FIELD

The present invention relates to an air conditioner of a heat pump system which conditions air in a vehicle interior, and more particularly, it relates to an air conditioner applicable to a hybrid car or an electric car.

BACKGROUND ART

Due to actualization of environmental problems in recent years, hybrid cars and electric cars have spread. Furthermore, as an air conditioner which is applicable to such a vehicle, there has been developed an air conditioner which comprises a compressor to compress and discharge a refrigerant, a radiator disposed on a vehicle interior side to let the refrigerant radiate heat, a heat absorber disposed on the vehicle interior side to let the refrigerant absorb heat, and an outdoor heat exchanger disposed on a vehicle exterior side to let the refrigerant radiate or absorb heat and which executes respective operation modes of a heating operation in which the refrigerant discharged from the compressor radiates heat in the radiator and the refrigerant by which heat has been radiated in the radiator absorbs heat in the outdoor heat exchanger, a dehumidifying and heating operation in which the refrigerant discharged from the compressor radiates heat in the radiator and the refrigerant by which heat has been radiated in the radiator absorbs heat only in the heat absorber or in this heat absorber and the outdoor heat exchanger, a cooling operation in which the refrigerant discharged from the compressor radiates heat in the outdoor heat exchanger and absorbs heat in the heat absorber, and a dehumidifying and cooling operation in which the refrigerant discharged from the compressor radiates heat in the radiator and the outdoor heat exchanger and absorbs heat in the heat absorber (e.g., see Patent Document 1).

In addition, the outdoor heat exchanger absorbs heat from outdoor air in the heating operation or the dehumidifying and heating operation, and hence frost formation occurs in the outdoor heat exchanger. When the formed frost grows in the outdoor heat exchanger, a capability to absorb the heat from the outdoor air remarkably deteriorates, and hence a defrosting operation is executed to remove the frost formation of the outdoor heat exchanger. However, during this defrosting operation, a temperature of air blown out into a vehicle interior lowers, comfort is impaired, and a power consumption increases, so that defrosting is to be minimized.

To minimize the defrosting of the outdoor heat exchanger, it is necessary to precisely judge the frost formation. Therefore, in the above publication, an outdoor air dew point temperature is calculated from an outdoor air temperature and an outdoor air humidity, it is judged whether or not a temperature of the refrigerant flowing out from the outdoor heat exchanger is lower than the outdoor air dew point temperature, and it is determined that the frost formation occurs in the outdoor heat exchanger in a case where the outdoor air dew point temperature is lower than the temperature of the refrigerant.

CITATION LIST

Patent Documents

Patent Document 1: Japanese Patent Application Publication No. 2012-176660

SUMMARY OF THE INVENTION

Problems to be Solved by the Invention

However, it is difficult to precisely detect the above outdoor air dew point temperature. Therefore, according to conventional frost formation judging, it has been difficult to precisely judge frost formation of an outdoor heat exchanger.

The present invention has been developed to solve these conventional technical problems, and an object thereof is to provide a vehicle air conditioner which improves a frost formation judging precision of an outdoor heat exchanger, acquires a heating performance, and avoids useless defrosting, thereby achieving reduction of power consumption.

Means for Solving the Problems

A vehicle air conditioner of the invention of claim 1 comprises a compressor which compresses a refrigerant, an air flow passage through which air to be supplied into a vehicle interior flows, a radiator disposed in this air flow passage to let the refrigerant radiate heat, an outdoor heat exchanger disposed outside the vehicle interior to let the refrigerant absorb heat, defrosting means for performing defrosting of this outdoor heat exchanger, and control means, this control means being configured to let the refrigerant discharged from the compressor radiate heat in the radiator, decompress the refrigerant by which heat has been radiated, and then let the refrigerant absorb heat in the outdoor heat exchanger, thereby heating in the vehicle interior, the vehicle air conditioner being characterized in that the control means judges frost formation onto this outdoor heat exchanger on the basis of a refrigerant evaporation pressure PXO of the outdoor heat exchanger and a refrigerant evaporation pressure PXObase of the outdoor heat exchanger during non-frost formation or on the basis of a refrigerant evaporation temperature TXO of the outdoor heat exchanger and a refrigerant evaporation temperature TXObase of the outdoor heat exchanger during the non-frost formation, and performs the defrosting of the outdoor heat exchanger by the defrosting means.

A vehicle air conditioner of the invention of claim 2 comprises a compressor which compresses a refrigerant, an air flow passage through which air to be supplied into a vehicle interior flows, a radiator disposed in this air flow passage to let the refrigerant radiate heat, an outdoor heat exchanger disposed outside the vehicle interior to let the refrigerant absorb heat, defrosting means for performing defrosting of this outdoor heat exchanger, and control means, this control means being configured to let the refrigerant discharged from the compressor radiate heat in the radiator, decompress the refrigerant by which heat has been radiated, and then let the refrigerant absorb heat only in a heat absorber or in this heat absorber and the outdoor heat exchanger, thereby dehumidifying and heating in the vehicle interior, the vehicle air conditioner being characterized in that the control means judges frost formation onto this outdoor heat exchanger on the basis of a refrigerant evaporation pressure PXO of the outdoor heat exchanger and a refrigerant evaporation pressure PXObase of the outdoor heat exchanger during non-frost formation or on the basis of a refrigerant evaporation temperature TXO of the outdoor heat exchanger and a refrigerant evaporation temperature TXObase of the outdoor heat exchanger during the non-frost formation, and performs the defrosting of the outdoor heat exchanger by the defrosting means.

A vehicle air conditioner of the invention of claim 3 comprises a compressor which compresses a refrigerant, an air flow passage through which air to be supplied into a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, defrosting means for performing defrosting of this outdoor heat exchanger, and control means, this control means being configured to change and execute at least one of a heating mode in which the refrigerant discharged from the compressor radiates heat in the radiator and the refrigerant by which heat has been radiated is decompressed and then absorbs heat in the outdoor heat exchanger, a dehumidifying and heating mode in which the refrigerant discharged from the compressor radiates heat in the radiator and the refrigerant by which heat has been radiated is decompressed and then absorbs heat only in the heat absorber or in the heat absorber and the outdoor heat exchanger, a dehumidifying and cooling mode in which the refrigerant discharged from the compressor radiates heat in the radiator and the outdoor heat exchanger and the refrigerant by which heat has been radiated is decompressed and then absorbs heat in the heat absorber, and a cooling mode in which the refrigerant discharged from the compressor radiates heat in the outdoor heat exchanger and the refrigerant by which heat has been radiated is decompressed and then absorbs heat in the heat absorber, the vehicle air conditioner being characterized in that in the heating mode and the dehumidifying and heating mode, the control means judges frost formation onto this outdoor heat exchanger on the basis of a refrigerant evaporation pressure PXO of the outdoor heat exchanger and a refrigerant evaporation pressure PXObase of the outdoor heat exchanger during non-frost formation or on the basis of a refrigerant evaporation temperature TXO of the outdoor heat exchanger and a refrigerant evaporation temperature TXObase of the outdoor heat exchanger during the non-frost formation, and performs the defrosting of the outdoor heat exchanger by the defrosting means.

The vehicle air conditioner of the invention of claim 4 is characterized in that in the above respective inventions, the control means determines the refrigerant evaporation pressure PXObase of the outdoor heat exchanger during the non-frost formation or the refrigerant evaporation temperature TXObase of the outdoor heat exchanger during the non-frost formation on the basis of at least one or any combination of indexes indicating a suction air temperature of the outdoor heat exchanger, a passing air speed of the outdoor heat exchanger, a refrigerant flow rate, a passing air volume of the radiator, and a load.

The vehicle air conditioner of the invention of claim 5 is characterized in that in the inventions of claim 1 to claim 3, the refrigerant evaporation pressure PCObase of the outdoor heat exchanger during the non-frost formation or the refrigerant evaporation temperature TXObase of the outdoor heat exchanger during the non-frost formation is determined on the basis of an efficiency of the outdoor heat exchanger during refrigerant evaporation, the refrigerant evaporation pressure of the outdoor heat exchanger at low humidity, or the refrigerant evaporation temperature of the outdoor heat exchanger at the low humidity.

The vehicle air conditioner of the invention of claim 6 is characterized in that in the above respective inventions, the control means judges that the frost is formed in the outdoor heat exchanger, when there is continued for a predetermined time a state where the refrigerant evaporation pressure PXO of the outdoor heat exchanger is lower than the refrigerant evaporation pressure PXObase of the outdoor heat exchanger during the non-frost formation and a difference ΔPXO is a predetermined value or more, or when there is continued for a predetermined time a state where the refrigerant evaporation temperature TXO of the outdoor heat exchanger is lower than the refrigerant evaporation temperature TXObase of the outdoor heat exchanger during the non-frost formation and a difference ΔTXO is a predetermined value or more.

The vehicle air conditioner of the invention of claim 7 is characterized in that in the above invention, the control means changes the predetermined value of the difference ΔPXO of the frost formation judging and/or a predetermined time of the frost formation judging, or the predetermined value of the difference ΔTXO of the frost formation judging and/or a predetermined time of the frost formation judging on the basis of at least one or any combination of indexes indicating an environmental condition, the load, and aging deterioration.

The vehicle air conditioner of the invention of claim 8 is characterized in that in the above respective inventions, the control means does not execute the frost formation judging of the outdoor heat exchanger in a transition period of an operating status.

The vehicle air conditioner of the invention of claim 9 is characterized in that in the above respective inventions, the control means does not execute the frost formation judging of the outdoor heat exchanger in a case where a vehicle speed noticeably varies.

Advantageous Effect of the Invention

According to a vehicle air conditioner of the inventions of claim 1 to claim 3, during heating and/or during dehumidifying and heating, control means judges frost formation onto an outdoor heat exchanger on the basis of a refrigerant evaporation pressure PXO of the outdoor heat exchanger and a refrigerant evaporation pressure PXObase of the outdoor heat exchanger during non-frost formation or on the basis of a refrigerant evaporation temperature TXO of the outdoor heat exchanger and a refrigerant evaporation temperature TXObase of the outdoor heat exchanger during the non-frost formation, and performs defrosting of the outdoor heat exchanger by defrosting means. Therefore, the frost formation of the outdoor heat exchanger can precisely be judged to enable the defrosting.

In consequence, the defrosting of the outdoor heat exchanger can be minimized, and it is possible to inhibit deterioration of comfort in a vehicle interior or increase of power consumption due to the defrosting.

In particular, as in the invention of claim 4, the control means determines the refrigerant evaporation pressure PXObase of the outdoor heat exchanger during the non-frost formation or the refrigerant evaporation temperature TXObase of the outdoor heat exchanger during the non-frost formation on the basis of at least one or any combination of indexes indicating a suction air temperature of the outdoor heat exchanger, a passing air speed of the outdoor heat exchanger, a refrigerant flow rate, a passing air volume of the radiator, and a load. In this case, it is possible to exactly obtain the refrigerant evaporation pressure PXObase or the refrigerant evaporation temperature TXObase of the outdoor heat exchanger during the non-frost formation which becomes a frost formation judging standard.

It is to be noted that as in the invention of claim 5, the refrigerant evaporation pressure PCObase of the outdoor heat exchanger during this non-frost formation or the refrigerant evaporation temperature TXObase of the outdoor heat exchanger during the non-frost formation can be determined on the basis of an efficiency of the outdoor heat exchanger during refrigerant evaporation, the refrigerant evaporation pressure of the outdoor heat exchanger at low humidity, or the refrigerant evaporation temperature of the outdoor heat exchanger at the low humidity.

Furthermore, as in the invention of claim 6, the control means judges that the frost is formed in the outdoor heat exchanger, when there is continued for a predetermined time a state where the refrigerant evaporation pressure PXO of the outdoor heat exchanger is lower than the refrigerant evaporation pressure PXObase of the outdoor heat exchanger during the non-frost formation and a difference ΔPXO is a predetermined value or more, or when there is continued for a predetermined time a state where the refrigerant evaporation temperature TXO of the outdoor heat exchanger is lower than the refrigerant evaporation temperature TXObase of the outdoor heat exchanger during the non-frost formation and a difference ΔTXO is a predetermined value or more. In consequence, it is possible to more precisely realize the frost formation judging of the outdoor heat exchanger so that wrong judgment due to an influence of a disturbance or the like is removed.

Additionally, as in the invention of claim 7, the control means changes the predetermined value of the difference ΔPXO of the frost formation judging and/or a predetermined time of the frost formation judging, or the predetermined value of the difference ΔTXO of the frost formation judging and/or a predetermined time of the frost formation judging on the basis of at least one or any combination of indexes indicating an environmental condition, the load, and aging deterioration. In this case, it is possible to rapidly and precisely realize the frost formation judging of the outdoor heat exchanger while removing the influence of the disturbance or the like.

Furthermore, when as in the invention of claim 8, the control means does not execute the frost formation judging of the outdoor heat exchanger in a transition period of an operating status, it is possible to effectively remove occurrence of the wrong judgment in the transition period, e.g., at the start of the operation or during the changing of the mode.

Furthermore, as in the invention of claim 9, the control means does not execute the frost formation judging of the outdoor heat exchanger in a case where a vehicle speed noticeably varies. Consequently, the frost formation judging of the outdoor heat exchanger can more precisely be realized so as to remove the wrong judgment which occurs when passing air through the outdoor heat exchanger noticeably varies.

MODE FOR CARRYING OUT THE INVENTION

Hereinafter, an embodiment of the present invention will be described in detail with reference to the drawings.

Figure 1:
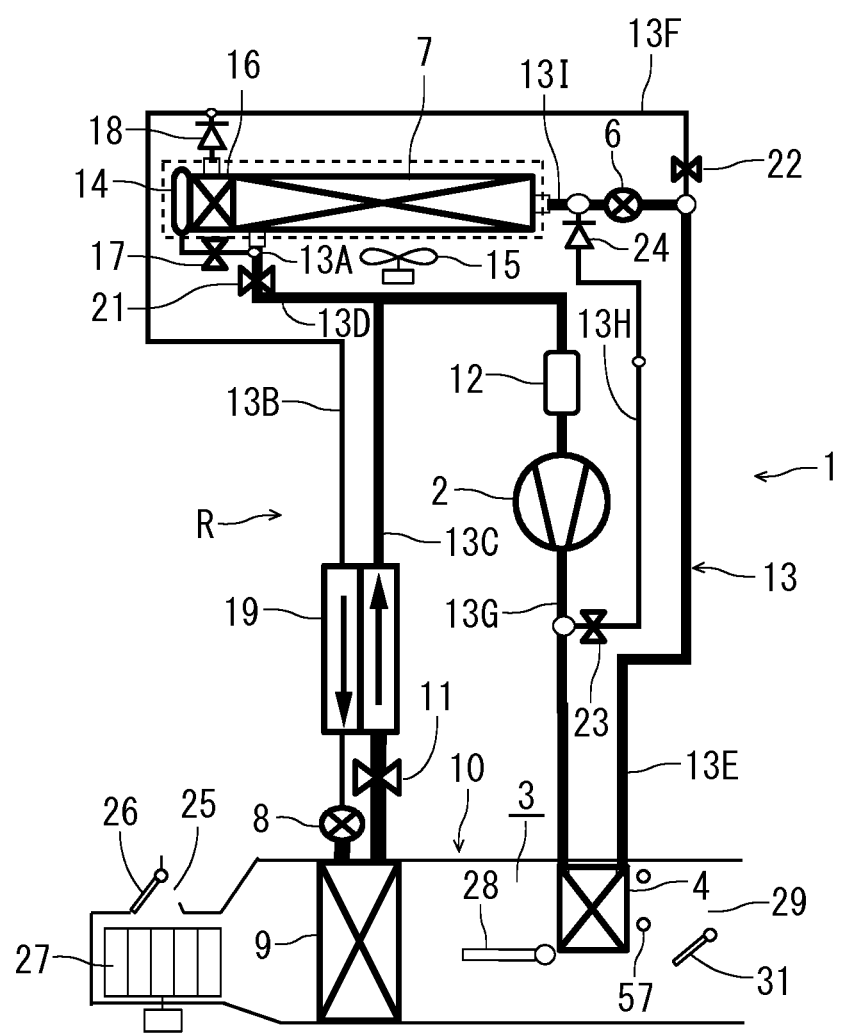
FIG. 1 is a constitutional view of a vehicle air conditioner of one embodiment to which the present invention is applied.

FIG. 1 shows a constitutional view of a vehicle air conditioner 1 of one embodiment of the present invention. In this case, a vehicle of the embodiment to which the present invention is applied is an electric car (EV) which does not have an engine (an internal combustion engine), and runs by driving an electric motor for running by a power charged in a battery (which is not shown), and the vehicle air conditioner 1 of the present invention is driven by the power of the battery.

That is, in the electric car in which heating cannot be performed by waste heat of the engine, the vehicle air conditioner 1 of the embodiment performs the heating by a heat pump operation in which a refrigerant circuit is used, and further selectively executes respective operation modes of dehumidifying and heating, cooling and dehumidifying, cooling, and the like. It is to be noted that the vehicle is not limited to the electric car, and the present invention is also effective for a so-called hybrid car in which the engine is used together with the electric motor for the running, and is further applicable also to a usual car which runs by the engine.

The vehicle air conditioner 1 of the embodiment performs air conditioning (heating, cooling, dehumidifying, and ventilation) in the electric car, and there are successively connected, by a refrigerant pipe 13, an electric compressor 2 which compresses a refrigerant to raise a pressure, a radiator 4 disposed in an air flow passage 3 of an HVAC unit 10 in which air in the vehicle interior is passed and circulated, to let the high-temperature high-pressure refrigerant discharged from the compressor 2 radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying and heating, an evaporation capability control valve 11 which regulates an evaporation capability in the heat absorber 9, an accumulator 12 and the like, so that a refrigerant circuit R is constituted. It is to be noted that in the outdoor heat exchanger 7, an outdoor blower 15 is disposed to perform the heat exchange between the outdoor air and the refrigerant when the vehicle is stopped.

In addition, the outdoor heat exchanger 7 has a header portion 14 and a subcooling portion 16 successively on a refrigerant downstream side, a refrigerant pipe 13A extended out from the outdoor heat exchanger 7 is connected to the header portion 14 via a solenoid valve (an opening/closing valve) 17 opened during the cooling, and an outlet of the subcooling portion 16 is connected to the indoor expansion valve 8 via a check valve 18. It is to be noted that the header portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during heating. Furthermore, a refrigerant pipe 13E on an outlet side of the radiator 4 is branched before the outdoor expansion valve 6, and this branched refrigerant pipe 13F communicates to be connected to the refrigerant pipe 13B on the downstream side of the check valve 18 via a solenoid valve (an opening/closing valve) 22 to be opened during the dehumidifying.

In addition, a refrigerant pipe 13G on a discharge side of the compressor 2 is branched, and this branched refrigerant pipe 13H communicates to be connected to a refrigerant pipe 13I between the outdoor expansion valve 6 and the outdoor heat exchanger 7 via a solenoid valve (an opening/closing valve) 23 which is opened in a defrost mode to perform defrosting of the outdoor heat exchanger 7 and allows the high-temperature refrigerant (a hot gas) discharged from the compressor 2 to flow directly into the outdoor heat exchanger 7 and a check valve 24. The solenoid valve 23 constitutes defrosting means in the present invention. It is to be noted that a direction of the refrigerant pipe 13I of the check valve 24 is the forward direction.

Additionally, in the air flow passage 3 on an air upstream side of the heat absorber 9, respective suction ports (represented by a suction port 25 in FIG. 1), e.g., an indoor air suction port and an outdoor air suction port are formed, and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Further, on an air downstream side of the suction changing damper 26, an indoor blower (a blower fan) 27 is disposed to supply the introduced indoor air or outdoor air to the air flow passage 3.

Additionally, in the air flow passage 3 on the air upstream side of the radiator 4, an air mix damper 28 is disposed to regulate a degree of flow of the indoor air or the outdoor air through the radiator 4. Further, in the air flow passage 3 on an air downstream side of the radiator 4, each outlet of foot, vent or defroster (represented by an outlet 29 in FIG. 1) is formed, and in the outlet 29, an outlet changing damper 31 is disposed to perform changing control of blowing of the air from each outlet mentioned above.

Figure 2:
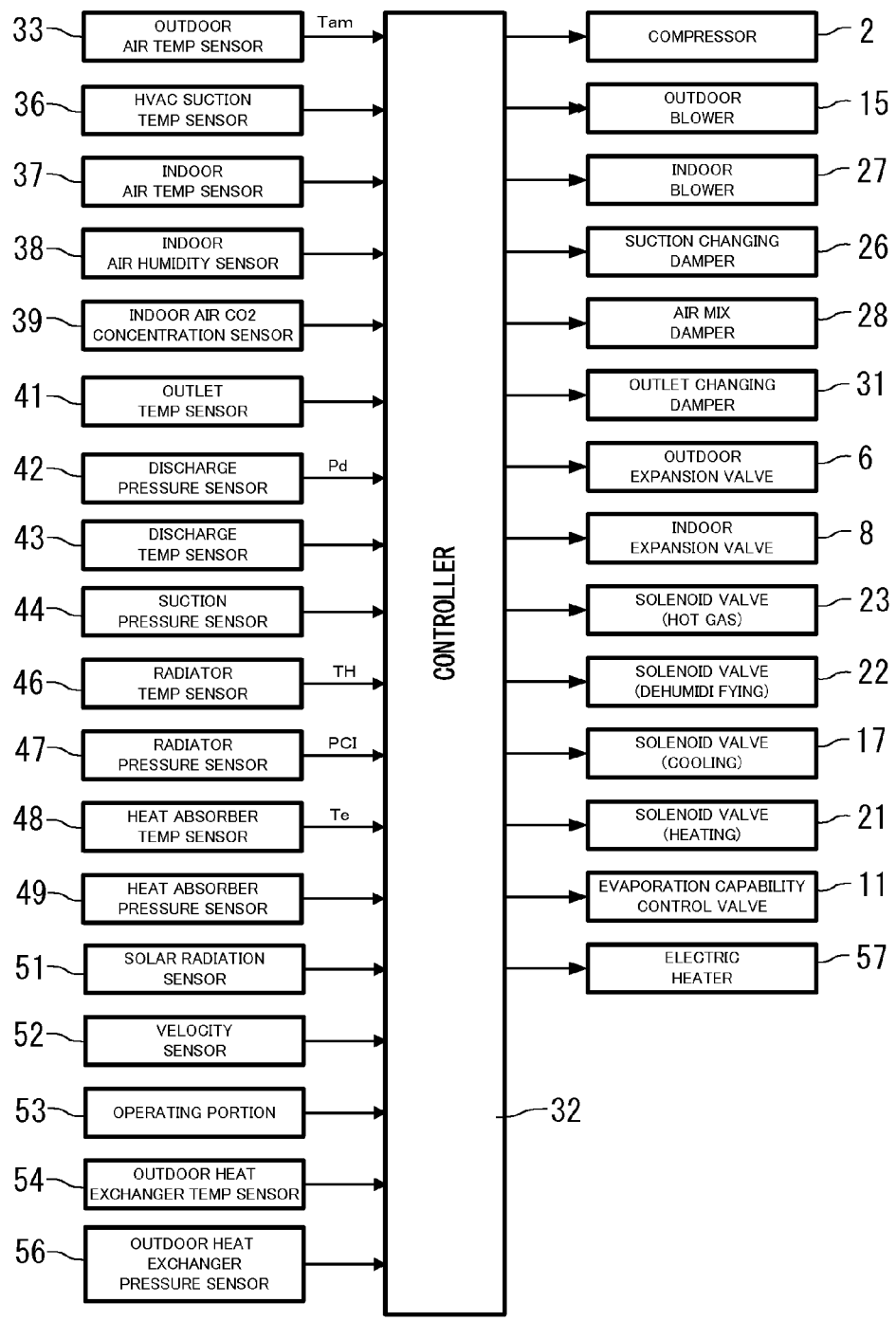
FIG. 2 is a block diagram of an electric circuit of a controller of the vehicle air conditioner of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an HVAC suction temperature sensor 36 which detects a suction temperature from the suction port 25 to the air flow passage 3, an indoor air temperature sensor 37 which detects a temperature of the air in the vehicle interior (the indoor air), an indoor air humidity sensor 38 which detects a humidity of the air in the vehicle interior, an indoor air $CO_2$ concentration sensor 39 which detects a carbon dioxide concentration in the vehicle interior, an outlet temperature sensor 41 which detects a temperature of the air blown out from the outlet 29 into the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the radiator 4 itself or the temperature of the air heated in the radiator 4), a radiator pressure sensor 47 which detects a refrigerant pressure of the radiator 4 (the pressure in the radiator 4 or the pressure of the refrigerant flowing out from the radiator 4), a heat absorber temperature sensor 48 which detects a temperature of the heat absorber 9 (the temperature of the heat absorber 9 itself or the air cooled in the heat absorber 9), a heat absorber pressure sensor 49 which detects a refrigerant pressure of the heat absorber 9 (the pressure in the heat absorber 9 or the pressure of the refrigerant flowing out from the heat absorber 9), a solar radiation sensor 51 of, e.g., a photo sensor system to detect a solar radiation amount into the vehicle interior, a velocity sensor 52 to detect a moving speed of the vehicle (a vehicle speed), an operating portion 53 to set the changing of the temperature or the operation mode, an outdoor heat exchanger temperature sensor 54 which detects a temperature of the outdoor heat exchanger 7, and an outdoor heat exchanger pressure sensor 56 which detects the refrigerant pressure of the outdoor heat exchanger 7.

An output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 23, 22, 17 and 21, and the evaporation capability control valve 11. In addition, the output of the controller 32 is also connected to an electric heater 57 disposed in the air flow passage 3 on the air downstream side of the radiator 4 to complement the heating by the radiator 4, and the controller 32 controls these components on the basis of the outputs of the respective sensors and the setting input by the operating portion 53.

Next, an operation of the vehicle air conditioner 1 of the embodiment having the abovementioned constitution will be described. In the embodiment, the controller 32 changes and executes respective roughly divided operation modes such as a heating mode, a dehumidifying and heating mode, an internal cycle mode, a dehumidifying and cooling mode, and a cooling mode. First, the flow of the refrigerant in each operation mode will be described.

(1) Heating Mode

When the heating mode is selected by the controller 32 or a manual operation to the operating portion 53, the controller 32 opens the solenoid valve 21 and closes the solenoid valve 17, the solenoid valve 22 and the solenoid valve 23. Furthermore, the compressor 2 and the respective blowers 15 and 27 are operated, and the air mix damper 28 has a state where the air blown out from the indoor blower 27 is passed through the radiator 4. In consequence, the high-temperature high-pressure gas refrigerant discharged from the compressor 2 flows into the radiator 4. The air in the air flow passage 3 is passed through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows through the refrigerant pipe 13E to reach the outdoor expansion valve 6 which decompresses the refrigerant, and then the refrigerant flows into the outdoor heat exchanger 7. The refrigerant flowing into the outdoor heat exchanger 7 evaporates, and the heat is pumped up from the outdoor air passed by running or the outdoor blower 15 (a heat pump). Furthermore, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29, and hence the heating in the vehicle interior is performed.

The controller 32 controls a revolution number of the compressor 2 on the basis of a high pressure of the refrigerant circuit R which is detected by the discharge pressure sensor 42 or the radiator pressure sensor 47, also controls a valve position of the outdoor expansion valve 6 on the basis of the temperature of the radiator 4 which is detected by the radiator temperature sensor 46 and the refrigerant pressure of the radiator 4 which is detected by the radiator pressure sensor 47, and controls a subcool degree of the refrigerant in the outlet of the radiator 4.

(2) Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating in the vehicle interior are performed.

The controller 32 controls the revolution number of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48.

(3) Internal Cycle Mode

Next, in the internal cycle mode, the controller 32 shuts off the outdoor expansion valve 6 in the above state of the dehumidifying and heating mode (a shut off position) and also closes the solenoid valve 21. When the outdoor expansion valve 6 and the solenoid valve 21 are closed, inflow of the refrigerant into the outdoor heat exchanger 7 and outflow of the refrigerant from the outdoor heat exchanger 7 are inhibited, and hence all the condensed refrigerant flowing through the radiator 4 and the refrigerant pipe 13E flows through the solenoid valve 22 and the refrigerant pipe 13F. Furthermore, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, and hence the dehumidifying and heating in the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability lowers.

The controller 32 controls the revolution number of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2 as described later.

(4) Dehumidifying and Cooling Mode

Next, in the dehumidifying and cooling mode, the controller 32 opens the solenoid valve 17 and closes the solenoid valve 21, the solenoid valve 22 and the solenoid valve 23. Furthermore, the compressor 2 and the respective blowers 15 and 27 are operated, and the air mix damper 28 has the state where the air blown out from the indoor blower 27 is passed through the radiator 4. In consequence, the high-temperature high-pressure gas refrigerant discharged from the compressor 2 flows into the radiator 4. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the header portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), and hence the dehumidifying and cooling in the vehicle interior are performed.

The controller 32 controls the revolution number of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R, and controls a refrigerant pressure (an after-mentioned radiator pressure PCI) of the radiator 4.

(5) Cooling Mode

Next, in the cooling mode, the controller 32 fully opens the outdoor expansion valve 6 in the above state of the dehumidifying and cooling mode (sets the valve position to an upper limit of controlling), and the air mix damper 28 has a state where the air is not passed through the radiator 4. In consequence, the high-temperature high-pressure gas refrigerant discharged from the compressor 2 flows into the radiator 4. The air in the air flow passage 3 is not passed through the radiator 4, the air therefore only passes here, and the refrigerant flowing out from the radiator 4 flows through the refrigerant pipe 13E to reach the outdoor expansion valve 6.

At this time, the outdoor expansion valve 6 is fully opened and hence the refrigerant flows into the outdoor heat exchanger 7 as it is, in which the refrigerant is cooled by the running therein or the outdoor air passed through the outdoor blower 15, to condensate and liquefy. The refrigerant flowing out from the outdoor heat exchanger 7 flows from the refrigerant pipe 13A through the solenoid valve 17 to successively flow into the header portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 into the vehicle interior, and hence cooling in the vehicle interior is performed.

Figure 3:
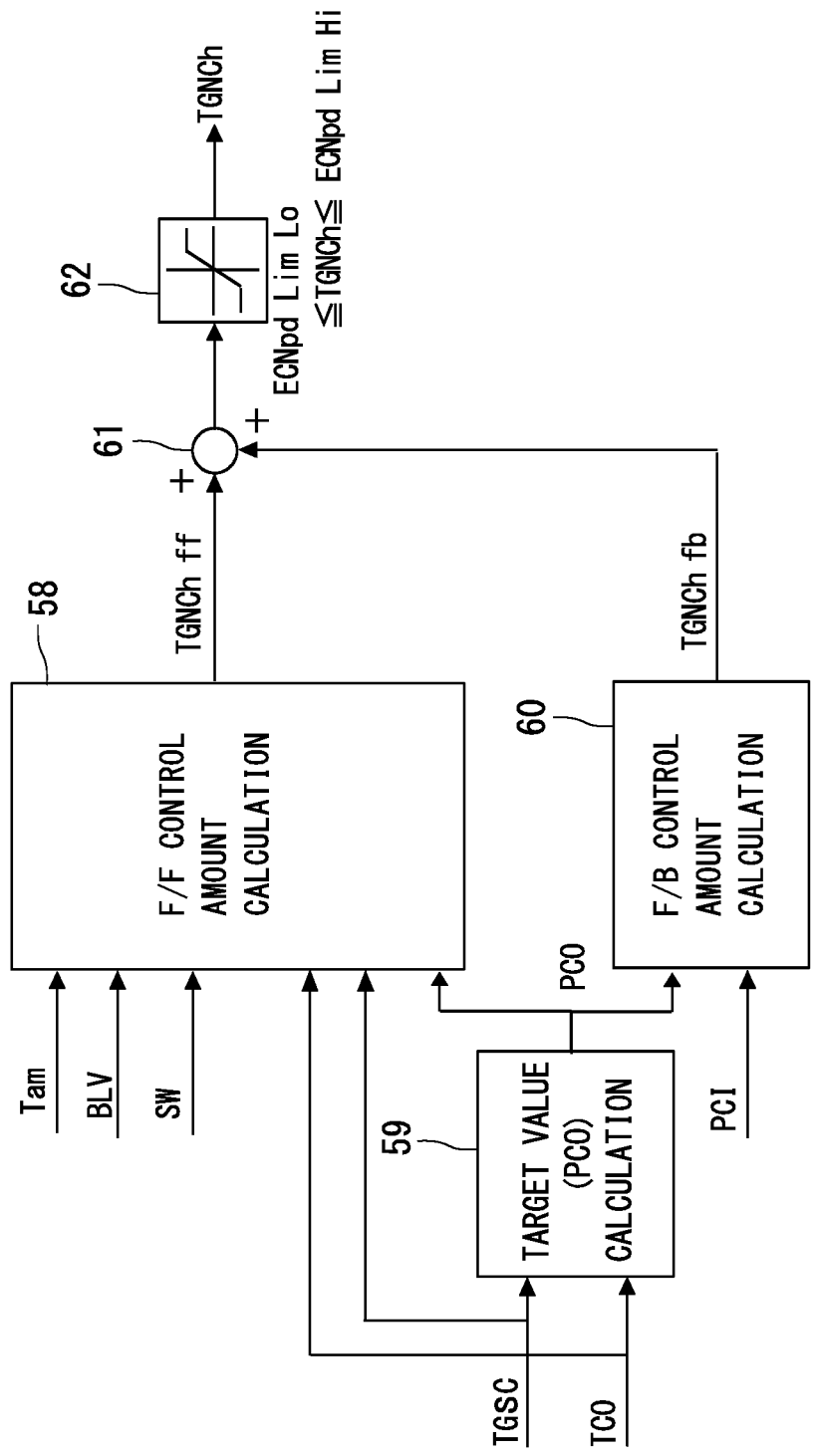
FIG. 3 is a control block diagram concerning compressor control of the controller of FIG. 2.
Figure 4:
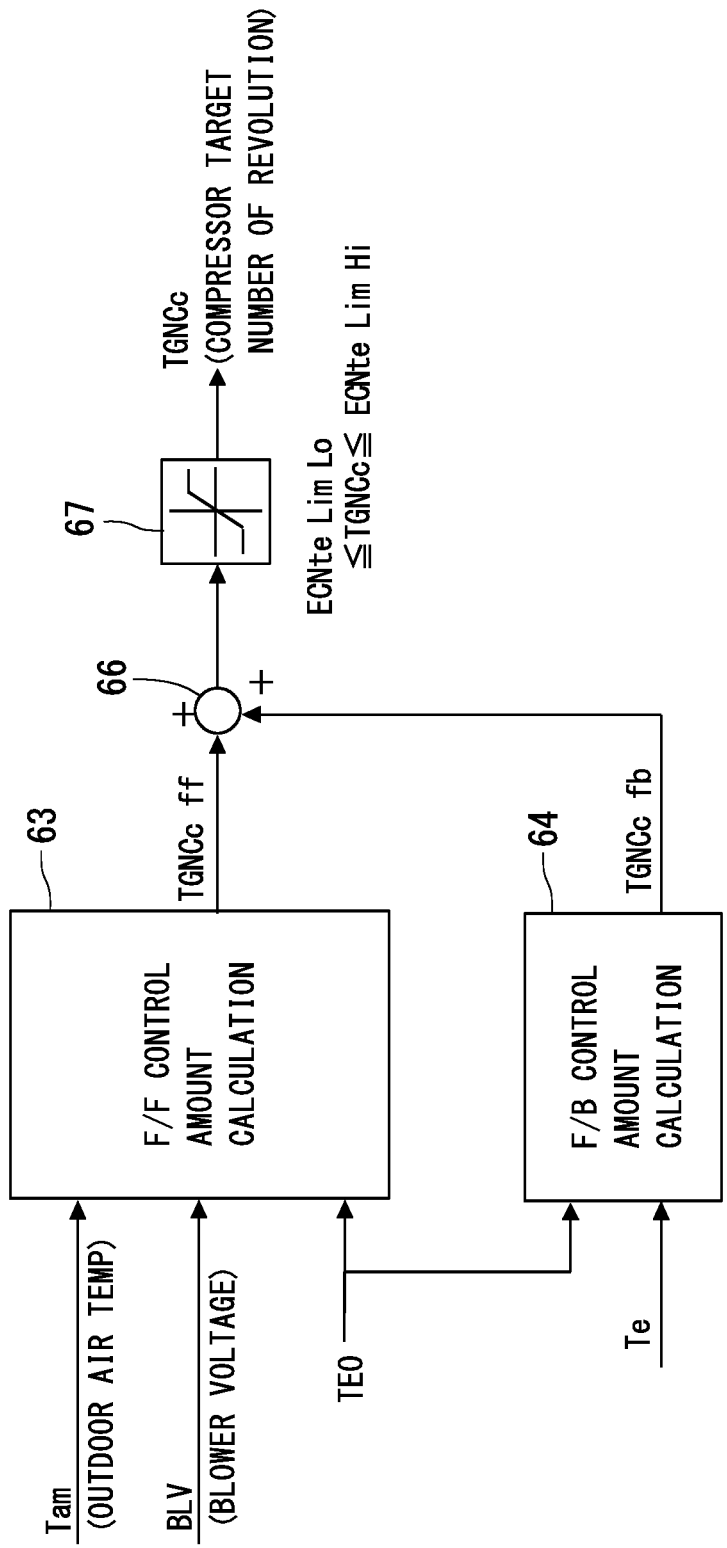
FIG. 4 is another control block diagram concerning the compressor control of the controller of FIG. 2.
Figure 5:
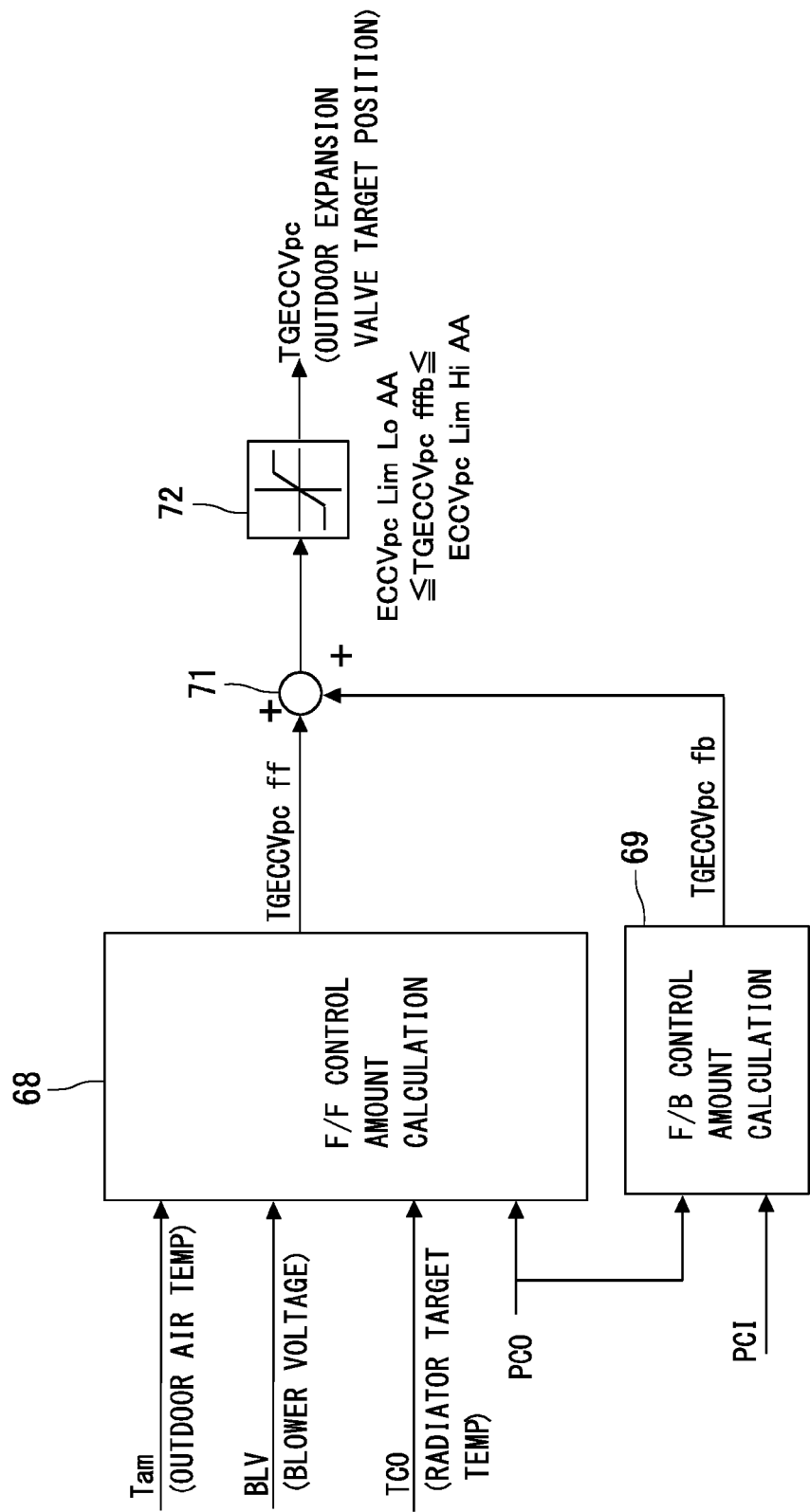
FIG. 5 is a control block diagram concerning outdoor expansion valve control of the controller of FIG. 2.

In this cooling mode, the controller 32 controls the revolution number of the compressor 2 on the basis of the temperature of the heat absorber 9 which is detected by the heat absorber temperature sensor 48. Next, FIG. 3 to FIG. 5 show control block diagrams of the compressor 2 and the outdoor expansion valve 6 by the controller 32 in the abovementioned respective operation modes. FIG. 3 is the control block diagram of the controller 32 which determines a target number of revolution (a compressor target number of revolution) TGNCh of the compressor 2 for the above heating mode and the above dehumidifying and heating mode. An F/F (feedforward) control amount calculation section 58 of the controller 32 calculates an F/F control amount TGNChff of the compressor target number of revolution on the basis of an outdoor air temperature Tam obtained from the outdoor air temperature sensor 33, a blower voltage BLV of the indoor blower 27, an air mix damper opening SW of the air mix damper 28 which is obtained in accordance with SW=(TAO−Te)/(TH−Te), a target subcool degree TGSC which is a target value of a subcool degree SC in the outlet of the radiator 4, a radiator target temperature TCO which is a target value of the temperature of the radiator 4, and a radiator target pressure PCO which is a target value of the pressure of the radiator 4.

It is to be noted that TAO is a target outlet temperature which is a target value of an air temperature from the outlet 29, TH is the temperature of the radiator 4 which is obtained from the radiator temperature sensor 46 (the radiator temperature), and Te is the temperature of the heat absorber 9 which is obtained from the heat absorber temperature sensor 48 (the heat absorber temperature). The air mix damper opening SW varies in a range of 0≤SW≤1, 0 indicates an air mix shut off state where the air is not passed through the radiator 4, and 1 indicates an air mix fully opened state where all the air in the air flow passage 3 is passed through the radiator 4.

The above radiator target pressure PCO is calculated on the basis of the above target subcool degree TGSC and the radiator target temperature TCO by a target value calculation section 59. Furthermore, an F/B (feedback) control amount calculation section 60 calculates an F/B control amount TGNChfb of the compressor target number of revolution on the basis of this radiator target pressure PCO and the radiator pressure PCI which is the refrigerant pressure of the radiator 4. Furthermore, the F/F control amount TGNCnff calculated by the F/F control amount calculation section 58 and the control amount TGNChfb calculated by the F/B control amount calculation section 60 are added by an adder 61, limits of an upper limit of controlling and a lower limit of controlling are attached by a limit setting section 62, and then the compressor target number of revolution TGNCh is determined. In the above heating mode and the dehumidifying and heating mode, the controller 32 controls the revolution number of the compressor 2 on the basis of this compressor target number of revolution TGNCh.

On the other hand, FIG. 4 is the control block diagram of the controller 32 which determines a target number of revolution (a compressor target number of revolution) TGNCc of the compressor 2 for the above cooling mode and the dehumidifying and cooling mode. An F/F control amount calculation section 63 of the controller 32 calculates an F/F control amount TGNCcff of the compressor target number of revolution on the basis of the outdoor air temperature Tam, the blower voltage BLV, and a heat absorber target temperature TEO which is a target value of the temperature of the heat absorber 9.

In addition, an F/B control amount calculation section 64 calculates an F/B control amount TGNCcfb of the compressor target number of revolution on the basis of the heat absorber target temperature TEO and the heat absorber temperature Te. Furthermore, the F/F control amount TGNCcff calculated by the F/F control amount calculation section 63 and the F/B control amount TGNCcfb calculated by the F/B control amount calculation section 64 are added by an adder 66, limits of an upper limit of controlling and a lower limit of controlling are attached by a limit setting section 67, and then the compressor target number of revolution TGNCc is determined. In the cooling mode and the dehumidifying and cooling mode, the controller 32 controls the revolution number of the compressor 2 on the basis of this compressor target number of revolution TGNCc.

It is to be noted that in the above internal cycle mode, the controller 32 controls the revolution number of the compressor 2 by use of a smaller control amount in the compressor target number of revolution TGNCh calculated for the heating mode and the dehumidifying and heating mode and the compressor target number of revolution TGNCc calculated for the cooling mode and the dehumidifying and cooling mode as described above.

Next, FIG. 5 is the control block diagram of the controller 32 which determines a target position (an outdoor expansion valve target position) TGECCVpc of the outdoor expansion valve 6 in the dehumidifying and cooling mode. An F/F control amount calculation section 68 of the controller 32 calculates an F/F control amount TGECCVpcff of the outdoor expansion valve target position on the basis of the outdoor air temperature Tam, the blower voltage BLV, the radiator target temperature TCO, and the radiator target pressure PCO.

In addition, an F/B control amount calculation section 69 calculates an F/B control amount TGECCVpcfb of the outdoor expansion valve target position on the basis of the radiator target pressure PCO and the radiator pressure PCI. Furthermore, the F/F control amount TGECCVpcff calculated by the F/F control amount calculation section 68 and the F/B control amount TGECCVpcfb calculated by the F/B control amount calculation section 69 are added by an adder 71, limits of an upper limit of controlling and a lower limit of controlling are attached by a limit setting section 72, and then the outdoor expansion valve target position TGECCVpc is determined. In the dehumidifying and cooling mode, the controller 32 controls the valve position of the outdoor expansion valve 6 on the basis of this outdoor expansion valve target position TGECCVpc.

The air flowing through the air flow passage 3 is subjected to the cooling from the heat absorber 9 and a heating operation from the radiator 4 (regulated by the air mix damper 28) in the above respective operation modes, to be blown out into the vehicle interior from the outlet 29. The controller 32 calculates the target outlet temperature TAO on the basis of the outdoor air temperature Tam detected by the outdoor air temperature sensor 33, the interior temperature which is detected by the indoor air temperature sensor 37, the above blower voltage, the solar radiation amount detected by the solar radiation sensor 51, and the like, and the target interior temperature (the set temperature) in the vehicle which is set by the operating portion 53, and each operation mode is changed to control the temperature of the air blown out from the outlet 29 into this target outlet temperature TAO as described later.

(6) Changing Control of Operation Mode

Figure 6:
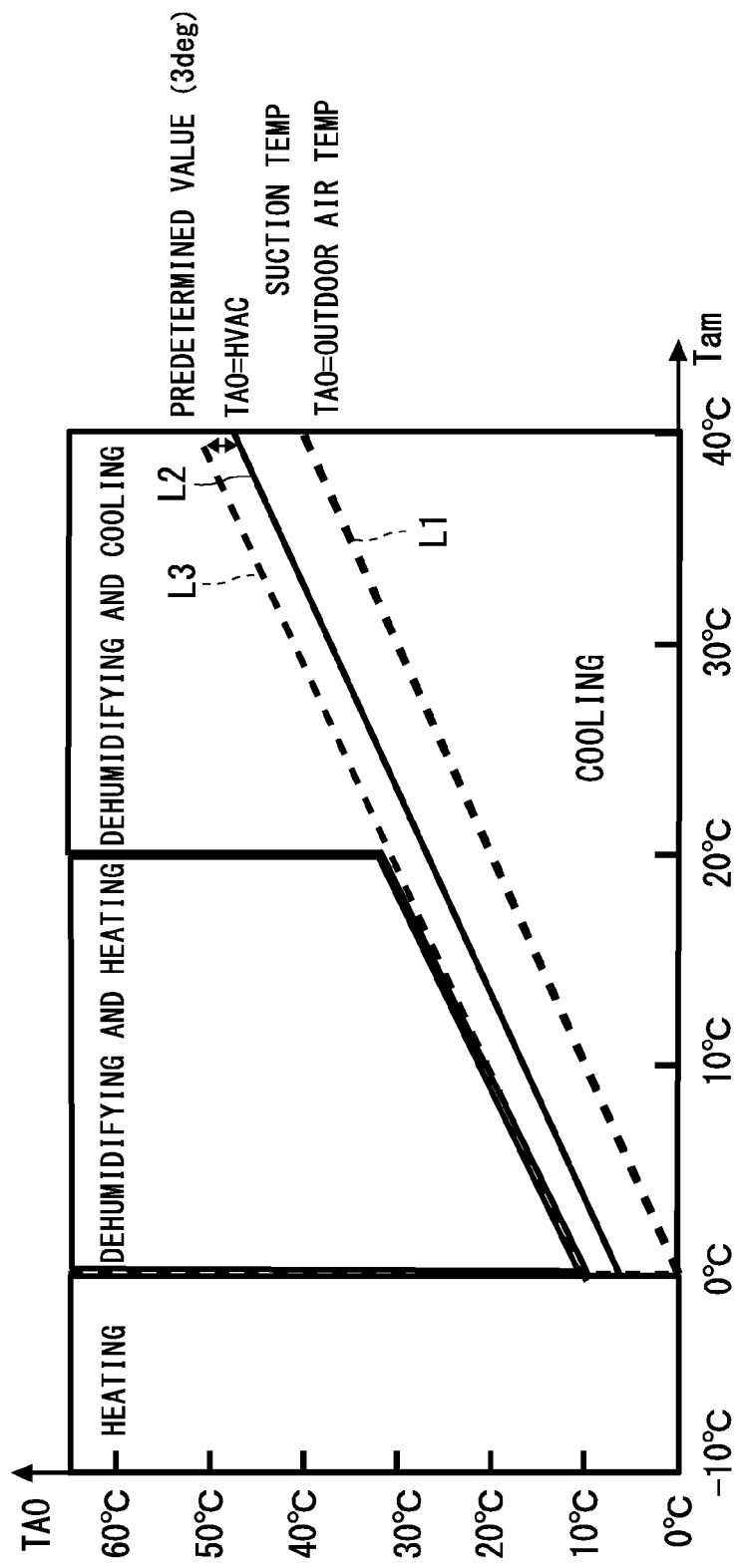
FIG. 6 is a diagram to explain changing control of an operation mode of the controller of FIG. 2.

Next, changing control of the above respective operation modes by the controller 32 will be described with reference to FIG. 6. The controller 32 selects the operation mode on startup as shown in FIG. 6. That is, in this embodiment, the controller 32 selects the operation mode on the basis of the outdoor air temperature Tam detected by the outdoor air temperature sensor 33 and the target outlet temperature TAO. In FIG. 6, a broken line L1 is a line of the target outlet temperature TAO=the outdoor air temperature Tam, and a solid line L2 is a line of the target outlet temperature TAO=HVAC suction temperature (the temperature of the air sucked from the suction port 25 to the air flow passage 3). In addition, a broken line L3 is a line of hysteresis set on a predetermined value (three degrees) above the solid line.

When the outdoor air temperature Tam of FIG. 6 is 0° C. or less, the controller 32 selects the heating mode. In addition, when the outdoor air temperature Tam is higher than 0° C. and the target outlet temperature TAO is the HVAC suction temperature or less, the controller selects the cooling mode. Furthermore, when the outdoor air temperature Tam is higher than 0° C. and is a predetermined value (e.g., 20° C. or the like) or less and when the target outlet temperature TAO is higher than the HVAC suction temperature, the controller selects the dehumidifying and heating mode, and further, when the outdoor air temperature Tam is higher than the predetermined value, the controller selects the dehumidifying and cooling mode.

Furthermore, after the start, the respective operation modes in FIG. 6 are selected and changed in accordance with changes of an environment or setting conditions, e.g., the above outdoor air temperature Tam and the target outlet temperature TAO. In this case, the controller 32 basically shifts from the heating mode to the dehumidifying and heating mode, or from the dehumidifying and heating mode to the heating mode, or from the dehumidifying and heating mode to the dehumidifying and cooling mode, or from the dehumidifying and cooling mode to the dehumidifying and heating mode, and shifts from the dehumidifying and cooling mode to the cooling mode, or from the cooling mode to the dehumidifying and cooling mode. However, when the controller shifts from the dehumidifying and heating mode to the dehumidifying and cooling mode and shifts from the dehumidifying and cooling mode to the dehumidifying and heating mode, the controller shifts via the above internal cycle mode. In addition, the controller shifts from the cooling mode to the internal cycle mode and from the internal cycle to the cooling mode sometimes.

(7) Defrosting Control of Outdoor Heat Exchanger

As described above, in the heating mode and the dehumidifying and heating mode, the outdoor heat exchanger 7 absorbs heat from the outdoor air to lower the temperature, and hence the water in the outdoor air forms frost to adhere to the outdoor heat exchanger 7. When this formed frost grows, heat exchange between the outdoor heat exchanger 7 and the passing outdoor air is remarkably disturbed, and an air conditioning performance deteriorates. Therefore, the controller 32 opens the solenoid valve 23 mentioned above to execute a defrost mode of the outdoor heat exchanger 7, but before that, the controller judges whether or not the frost is formed in the outdoor heat exchanger 7.

(7-1) Frost Formation Judging of Outdoor Heat Exchanger (No. 1)

Next, one example of frost formation judging of the outdoor heat exchanger 7 will be described with reference to FIG. 7. The controller 32 first allows the frost formation judging of the outdoor heat exchanger 7, when (i) of the following frost formation judging allowing conditions is established and one of (ii) to (iv) is established.

[Frost Formation Judgment Allowing Conditions]

(i) The operation mode is the heating mode or the dehumidifying and heating mode.

(ii) The high pressure converges at a target value. Specifically, an example of this condition is a condition that there is continued for a predetermined time t1 (sec) a state where an absolute value of a difference (PCO−PCI) between the radiator target pressure PCO and the radiator pressure PCI is a predetermined value A or less.

(iii) A predetermined time t2 (sec) passes after the mode shifts to the heating mode or the dehumidifying and heating mode.

(iv) A vehicle speed variance is a predetermined value or less (an acceleration/deceleration speed of the vehicle is the predetermined value or less). The acceleration/deceleration speed of the vehicle is, for example, a difference (VSP−VSPz) between the current vehicle speed VSP and a vehicle speed VSPz of one second before.

The above conditions (ii) and (iii) are conditions to remove wrong judgment occurring in a transition period of an operating status. Furthermore, also when the vehicle speed noticeably varies, the wrong judgment occurs, and hence the above condition (iv) is added.

When the above frost formation judging allowing conditions are established to allow the frost formation judging, the controller 32 judges whether or not the frost is formed in the outdoor heat exchanger 7 on the basis of a current refrigerant evaporation pressure PXO of the outdoor heat exchanger 7 which is obtained from the outdoor heat exchanger pressure sensor 56 and a refrigerant evaporation pressure PXObase of the outdoor heat exchanger 7 during non-frost formation when the outdoor air is a low humidity environment and the frost is not formed in the outdoor heat exchanger 7. The controller 32 in this case determines the refrigerant evaporation pressure PXObase of the outdoor heat exchanger 7 during the non-frost formation by use of the following equation (I).

$$PXObase = f(Tam, NC, BLV, VSP) \quad\quad (I)$$
$$= k1 \times Tam + k2 \times NC + k3 \times BLV + k4 \times VSP$$

Here, as to parameters of Equation (I), Tam is an outdoor air temperature obtained from the outdoor air temperature sensor 33, NC is a revolution number of the compressor 2, BLV is a blower voltage of the indoor blower 27, VSP is a vehicle speed obtained from the velocity sensor 52, and k1 to k4 are coefficients which are obtained beforehand by experiments.

The above outdoor air temperature Tam is an index indicating the suction air temperature of the outdoor heat exchanger 7, and there is a tendency that the lower the outdoor air temperature Tam (the suction air temperature of the outdoor heat exchanger 7) is, the lower the pressure PXObase becomes. Therefore, the coefficient k1 is a positive value. It is to be noted that the index indicating the suction air temperature of the outdoor heat exchanger 7 is not limited to the outdoor air temperature Tam.

In addition, the above revolution number NC of the compressor 2 is an index indicating a refrigerant flow rate in the refrigerant circuit R, and there is a tendency that the higher the revolution number NC is (the larger the refrigerant flow rate is), the lower the pressure PXObase becomes. Therefore, the coefficient k2 is a negative value.

In addition, the above blower voltage BLV is an index indicating a passing air volume of the radiator 4, and there is a tendency that the higher the blower voltage BLV is (the larger a passing air volume of the radiator 4 is), the lower the pressure PXObase becomes. Therefore, the coefficient k3 is a negative value. It is to be noted that the index indicating the passing air volume of the radiator 4 is not limited to this example, and may be a blower air volume of the indoor blower 27 or an opening SW of the air mix damper 28.

In addition, the above vehicle speed VSP is an index indicating a passing air speed of the outdoor heat exchanger 7, and there is a tendency that the lower the vehicle speed VSP is (the lower the passing air speed of the outdoor heat exchanger 7 is), the lower the pressure PXObase becomes. Therefore, the coefficient k4 is a positive value. It is to be noted that the index indicating the passing air speed of the outdoor heat exchanger 7 is not limited to this example, and may be a voltage of the outdoor blower 15.

It is to be noted that in the embodiment, as the parameters of Equation (I), the outdoor air temperature Tam, the revolution number NC of the compressor 2, the blower voltage BLV of the indoor blower 27 and the vehicle speed VSP are used, but a load of the vehicle air conditioner 1 may be added as a parameter to them. It is considered that examples of an index indicating this load include the target outlet temperature TAO, the revolution number NC of the compressor 2, the blower air volume of the indoor blower 27, an inlet air temperature of the radiator 4, and a radiator temperature TH of the radiator 4, and there is a tendency that the larger the load is, the lower the pressure PXObase becomes. Furthermore, aging deterioration of the vehicle (the number of driving years or the number of driving times) may be added to the parameters. In addition, the parameters of Equation (I) are not limited to all of the above parameters, and one of them or any combination of them may be used.

Next, the controller 32 calculates a difference ΔPXO (ΔPXO=PXObase−PXO) between the refrigerant evaporation pressure PXObase during the non-frost formation which is obtained by substituting respective current parameter values into Equation (I) and the current refrigerant evaporation pressure PXO, and judges that the frost is formed in the outdoor heat exchanger 7 when there is continued for a predetermined time t3 (sec) or more a state where the refrigerant evaporation pressure PXO is lower than the refrigerant evaporation pressure PXObase during the non-frost formation and the difference ΔPXO is a predetermined value dPXOFST (deg° C.) or more.

Figure 7:
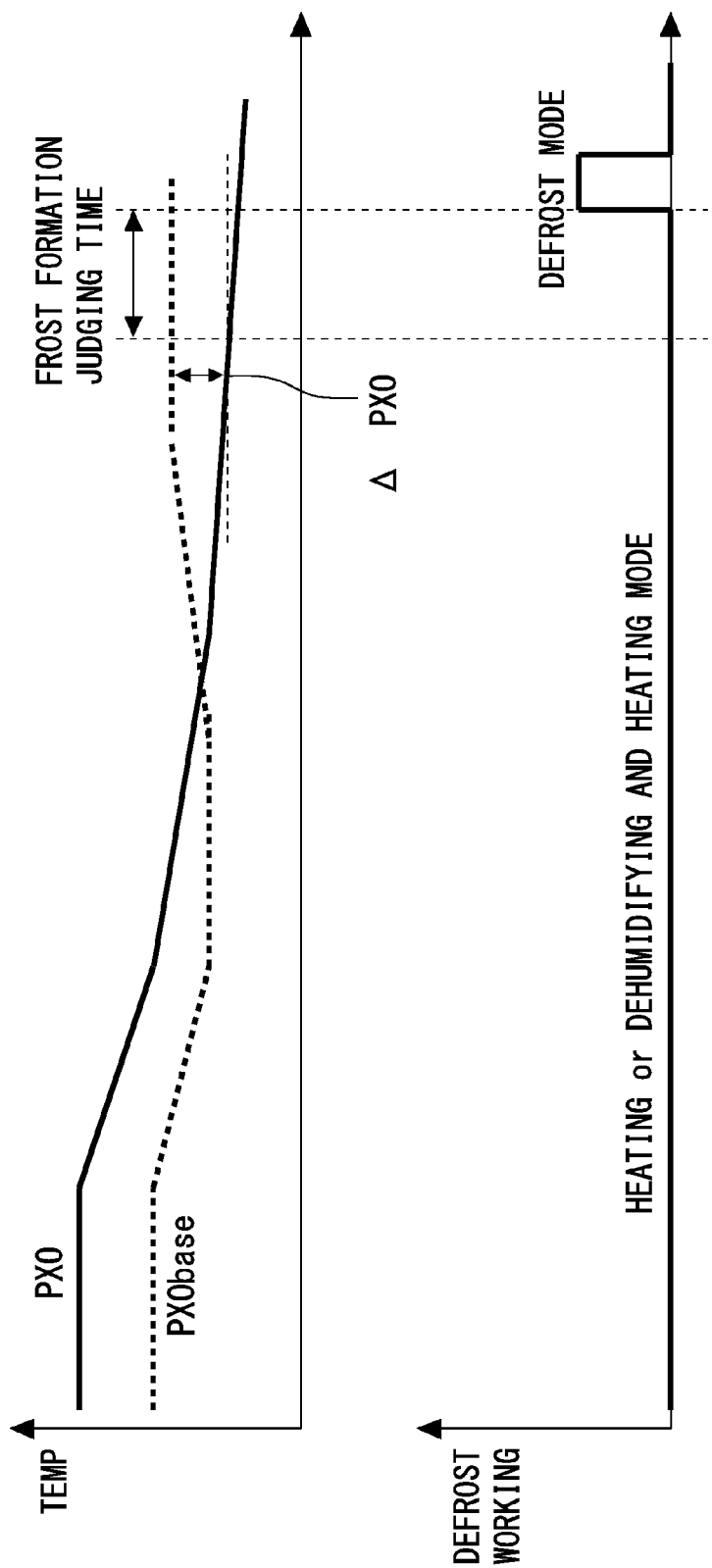
FIG. 7 is a timing chart to explain frost formation judging of an outdoor heat exchanger by the controller of FIG. 2.

In FIG. 7, a solid line shows a change of the refrigerant evaporation pressure PXO of the outdoor heat exchanger 7, and a broken line shows a change of the refrigerant evaporation pressure PXObase during the non-frost formation. In the beginning of the operation, the refrigerant evaporation pressure PXO of the outdoor heat exchanger 7 is high and is in excess of the refrigerant evaporation pressure PXObase during the non-frost formation. An interior temperature is raised accompanying progress of the heating mode or the dehumidifying and heating mode, and the load of the vehicle air conditioner 1 lowers, and hence the abovementioned refrigerant flow rate or the passing air volume of the radiator 4 also lowers, and PXObase (the broken line of FIG. 7) calculated in accordance with Equation (I) rises. On the other hand, when the frost formation occurs in the outdoor heat exchanger 7, a heat exchange performance with the outdoor air is disturbed, so that the refrigerant evaporation pressure PXO (the solid line) drops and then falls below PXObase. Then, the drop of the refrigerant evaporation pressure PXO further proceeds, and the difference ΔPXO (PXObase−PXO) reaches the predetermined value dPXOFST or more. Furthermore, when this state is continued for the predetermined time t3 or more, the controller 32 judges the frost formation.

It is to be noted that in the embodiment, the controller 32 changes the predetermined value dPXOFST and the predetermined time t3 of the above frost formation judging by use of one or any combination of indexes indicating, for example, an environmental condition, the load of the vehicle air conditioner 1, and aging deterioration of the vehicle air conditioner 1. It is considered that the above index indicating the environmental condition is the outdoor air temperature Tam mentioned above or the like, and when the outdoor air temperature Tam is lower, the frost is easily formed. Therefore, the controller 32 decreases the predetermined value dPXOFST of the frost formation judging and shortens the predetermined time t3.

In addition, it is considered that in the same manner as described above, the above index indicating the load is the target outlet temperature TAO, the revolution number NC of the compressor 2, the blower air volume of the indoor blower 27, the indoor air temperature of the radiator 4, the radiator temperature TH of the radiator 4, or the like, and when the load is larger, the frost is easily formed. Therefore, the controller 32 decreases the predetermined value dPXOFST of the frost formation judging and shortens the predetermined time t3. Furthermore, it is considered that the index indicating the above aging deterioration is the number of driving years or the number of driving times, and when the aging deterioration further proceeds, the frost is also easily formed. Therefore, the controller 32 decreases the predetermined value dPXOFST of the frost formation judging and shortens the predetermined time t3. It is to be noted that such change may be executed only for the predetermined value dPXOFST or the predetermined time t3.

(7-2) Defrost Mode of Outdoor Heat Exchanger

The controller 32 shifts to the defrost mode, when it is judged that the frost formation occurs in the outdoor heat exchanger 7 as described above. In this defrost mode, the controller 32 opens the solenoid valve 23 and the solenoid valve 21 and closes the solenoid valve 22 and the solenoid valve 17 to operate the compressor 2. In consequence, the high-temperature high-pressure gas refrigerant (a hot gas) discharged from the compressor 2 flows through the solenoid valve 23 and the refrigerant pipe 13H and flows through the condenser 24 to flow from the refrigerant pipe 13I directly into the outdoor heat exchanger 7. In consequence, the outdoor heat exchanger 7 is heated, and hence the formed frost is melted and removed.

The refrigerant flowing out from the outdoor heat exchanger 7 flows from the refrigerant pipe 13A through the solenoid valve 21 to enter the refrigerant pipe 13D, and is sucked through the refrigerant pipe 13B into the compressor 2. Furthermore, when a predetermined time passes from the start of the defrost mode, the controller 32 ends the defrost mode to return to the heating mode or the dehumidifying and heating mode.

(7-3) Frost Formation Judging of Outdoor Heat Exchanger (No. 2)

Next, another example of the frost formation judging of the outdoor heat exchanger 7 will be described with reference to FIG. 8. Frost formation judging allowing conditions are similar to those described in the abovementioned frost formation judging (No. 1). Furthermore, when these frost formation judging allowing conditions are established and the frost formation judging is allowed, in this embodiment, the controller 32 judges whether or not the frost is formed in the outdoor heat exchanger 7, on the basis of a current refrigerant evaporation temperature TXO of the outdoor heat exchanger 7 which is obtained from the outdoor heat exchanger temperature sensor 54 and a refrigerant evaporation temperature TXObase of the outdoor heat exchanger 7 during the non-frost formation when the outdoor air is a low humidity environment and the frost is not formed in the outdoor heat exchanger 7. The controller 32 in this case determines the refrigerant evaporation temperature TXObase of the outdoor heat exchanger 7 during the non-frost formation by use of the following equation (II).

$$TXObase = f(Tam, NC, BLV, VSP) \quad \text{(II)}$$
$$= k5 \times Tam + k6 \times NC + k7 \times BLV + k8 \times VSP$$

Here, as to parameters of Equation (II), in the same manner as described above, Tam is an outdoor air temperature obtained from the outdoor air temperature sensor 33, NC is a revolution number of the compressor 2, BLV is a blower voltage of the indoor blower 27, VSP is a vehicle speed obtained from the velocity sensor 52, and k5 to k8 are coefficients which are obtained beforehand by experiments.

In the same manner as described above, the outdoor air temperature Tam is an index indicating the suction air temperature of the outdoor heat exchanger 7, and there is a tendency that the lower the outdoor air temperature Tam (the suction air temperature of the outdoor heat exchanger 7) is, the lower the temperature TXObase becomes. Therefore, the coefficient k5 is a positive value. It is to be noted that similarly, the index indicating the suction air temperature of the outdoor heat exchanger 7 is not limited to the outdoor air temperature Tam.

In addition, the revolution number NC of the compressor 2 is similarly an index indicating the refrigerant flow rate in the refrigerant circuit R, and there is a tendency that the higher the revolution number NC is (the larger the refrigerant flow rate is), the lower the temperature TXObase becomes. Therefore, the coefficient k6 is a negative value.

In addition, the blower voltage BLV is similarly an index indicating the passing air volume of the radiator 4, and there is a tendency that the higher the blower voltage BLV is (the larger the passing air volume of the radiator 4 is), the lower the temperature TXObase becomes. Therefore, the coefficient k7 is a negative value. It is to be noted that similarly, the index indicating the passing air volume of the radiator 4 is not limited to this example, and may be a blower air volume of the indoor blower 27 or the opening SW of the air mix damper 28.

In addition, the vehicle speed VSP is similarly an index indicating the passing air speed of the outdoor heat exchanger 7, and there is a tendency that the lower the vehicle speed VSP is (the lower the passing air speed of the outdoor heat exchanger 7 is), the lower the temperature TXObase becomes. Therefore, the coefficient k8 is a positive value. It is to be noted that similarly, the index indicating the passing air speed of the outdoor heat exchanger 7 is not limited to this example, and may be the voltage of the outdoor blower 15.

It is to be noted that also in this embodiment, as the parameters of Equation (II), the outdoor air temperature Tam, the revolution number NC of the compressor 2, the blower voltage BLV of the indoor blower 27 and the vehicle speed VSP are used, but similarly, the load of the vehicle air conditioner 1 may be added as a parameter to them. It is considered that examples of this index indicating the load similarly include the target outlet temperature TAO, the revolution number NC of the compressor 2, the blower air volume of the indoor blower 27, the inlet air temperature of the radiator 4, and the radiator temperature TH of the radiator 4, and there is a tendency that the larger the load is, the lower the temperature TXObase becomes. Furthermore, aging deterioration of the vehicle (the number of driving years or the number of driving times) may be added to the parameters. In addition, the parameters of Equation (II) are not limited to all of the above parameters, and one of them or any combination of them may be used.

Next, the controller 32 calculates a difference ΔTXO (ΔTXO=TXObase−TXO) between the refrigerant evaporation temperature TXObase during the non-frost formation which is obtained by substituting respective current parameter values into Equation (II) and the current refrigerant evaporation temperature TXO, and judges that the frost is formed in the outdoor heat exchanger 7 when there is continued for a predetermined time t4 (sec) or more a state where the refrigerant evaporation temperature TXO is lower than the refrigerant evaporation temperature TXObase during the non-frost formation and the difference ΔTXO is a predetermined value dTXOFST (deg° C.) or more.

Figure 8:
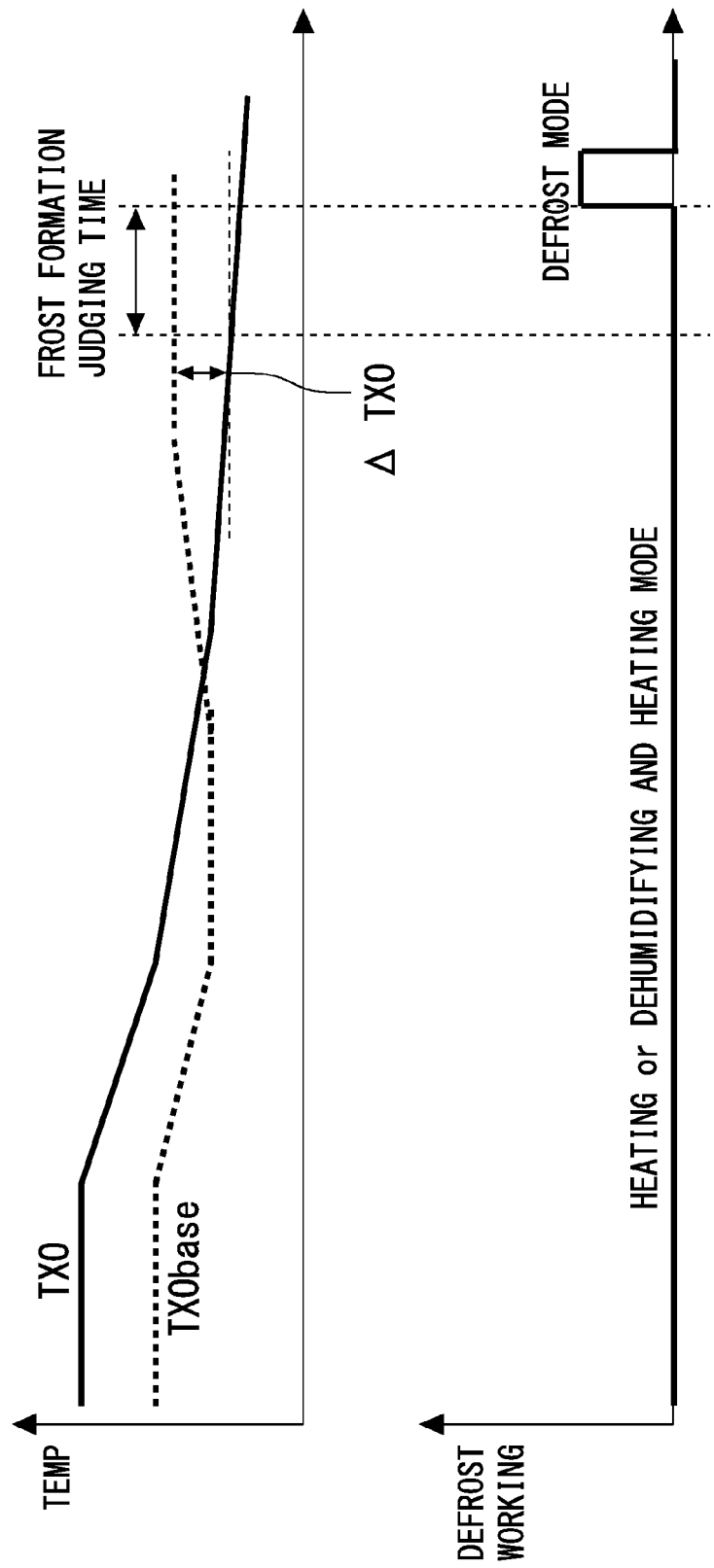
FIG. 8 is a timing chart to explain another frost formation judging of the outdoor heat exchanger by the controller of FIG. 2.

In FIG. 8, a solid line shows a change of the refrigerant evaporation temperature TXO of the outdoor heat exchanger 7, and a broken line shows a change of the refrigerant evaporation temperature TXObase during the non-frost formation. In the beginning of the operation, the refrigerant evaporation temperature TXO of the outdoor heat exchanger 7 is high and is in excess of the refrigerant evaporation temperature TXObase during the non-frost formation. An interior temperature is raised accompanying progress of the heating mode or the dehumidifying and heating mode, and the load of the vehicle air conditioner 1 lowers, and hence the abovementioned refrigerant flow rate or the passing air volume of the radiator 4 lowers, and TXObase (the broken line of FIG. 8) calculated in accordance with Equation (II) rises. On the other hand, when the frost formation occurs in the outdoor heat exchanger 7, a heat exchange performance with the outdoor air is disturbed, so that the refrigerant evaporation temperature TXO (the solid line) drops and then falls below TXObase. Then, the drop of the refrigerant evaporation temperature TXO further proceeds, and the difference ΔTXO (TXObase−TXO) reaches the predetermined value dTXOFST or more. Furthermore, when this state is continued for the predetermined time t4 or more, the controller 32 judges the frost formation, to enter the abovementioned defrost mode of the outdoor heat exchanger 7. The subsequent defrost mode is similar to the abovementioned mode.

It is to be noted that also in the embodiment, the controller 32 changes the predetermined value dTXOFST and the predetermined time t4 of the above frost formation judging by use of one or any combination of indexes indicating, for example, an environmental condition, the load of the vehicle air conditioner 1, and aging deterioration of the vehicle air conditioner 1. It is considered that the above index indicating the environmental condition is the outdoor air temperature Tam mentioned above or the like, and when the outdoor air temperature Tam is lower, the frost is easily formed. Therefore, the controller 32 decreases the predetermined value dTXOFST of the frost formation judging and shortens the predetermined time t4.

In addition, it is considered that in the same manner as described above, the above index indicating the load is the target outlet temperature TAO, the revolution number NC of the compressor 2, the blower air volume of the indoor blower 27, the indoor air temperature of the radiator 4, the radiator temperature TH of the radiator 4, or the like, and when the load is larger, the frost is easily formed. Therefore, the controller 32 decreases the predetermined value dTXOFST of the frost formation judging and shortens the predetermined time t4. Furthermore, it is considered that the index indicating the above aging deterioration is the number of driving years or the number of driving times, and when the aging deterioration proceeds, the frost is also easily formed. Therefore, the controller 32 decreases the predetermined value dTXOFST of the frost formation judging and shortens the predetermined time t4. It is to be noted that such change may similarly be executed only for the predetermined value dTXOFST or the predetermined time t4.

As described above, during the heating mode and the dehumidifying and heating mode, the controller 32 judges the frost formation onto the outdoor heat exchanger 7 on the basis of the refrigerant evaporation pressure PXO of the outdoor heat exchanger 7 and the refrigerant evaporation pressure PXObase of the outdoor heat exchanger 7 during the non-frost formation, or on the basis of the refrigerant evaporation temperature TXO of the outdoor heat exchanger 7 and the refrigerant evaporation temperature TXObase of the outdoor heat exchanger 7 during the non-frost formation, and opens the solenoid valve 23 to perform defrosting of the outdoor heat exchanger 7 by the high-temperature refrigerant gas (the hot gas). Therefore, the frost formation of the outdoor heat exchanger 7 can precisely be judged to enable the defrosting.

In consequence, the defrosting of the outdoor heat exchanger 7 can be minimized, and it is possible to inhibit deterioration of comfort in the vehicle interior or increase of power consumption due to the defrosting.

In particular, the controller 32 determines the refrigerant evaporation pressure PXObase of the outdoor heat exchanger 7 during the non-frost formation or the refrigerant evaporation temperature TXObase of the outdoor heat exchanger 7 during the non-frost formation on the basis of at least one or any combination of indexes indicating a suction air temperature of the outdoor heat exchanger 7, a passing air speed of the outdoor heat exchanger 7, a refrigerant flow rate, a passing air volume of the radiator 4, and a load of the vehicle air conditioner 1. Therefore, it is possible to exactly obtain the refrigerant evaporation pressure PXObase or the refrigerant evaporation temperature TXObase of the outdoor heat exchanger 7 during the non-frost formation which becomes a frost formation judging standard.

Furthermore, the controller 32 judges that the frost is formed in the outdoor heat exchanger 7, when there is continued for the predetermined time t3 the state where the refrigerant evaporation pressure PXO of the outdoor heat exchanger 7 is lower than the refrigerant evaporation pressure PXObase of the outdoor heat exchanger 7 during the non-frost formation and the difference ΔPXO is the predetermined value dPXOFST or more, or when there is continued for the predetermined time t4 the state where the refrigerant evaporation temperature TXO of the outdoor heat exchanger 7 is lower than the refrigerant evaporation temperature TXObase of the outdoor heat exchanger 7 during the non-frost formation and the difference ΔTXO is the predetermined value dTXOFST or more. Therefore, it is possible to more precisely realize the frost formation judging of the outdoor heat exchanger 7 so that wrong judgment due to an influence of a disturbance or the like is removed.

Additionally, the controller 32 changes the predetermined value dPXOFST of the difference ΔPXO of the frost formation judging, the predetermined value dTXOFST of the difference ΔTXO, or the predetermined time t3 or t4 of the frost formation judging on the basis of at least one or any combination of indexes indicating the environmental condition, the load, and the aging deterioration. Therefore, it is possible to rapidly and precisely realize the frost formation judging of the outdoor heat exchanger 7 while removing the influence of the disturbance or the like.

Furthermore, the controller 32 does not execute the frost formation judging of the outdoor heat exchanger 7 in a transition period of an operating status, and hence it is possible to effectively remove occurrence of the wrong judgment in the transition period, e.g., at the start of the operation or during the changing of the operation mode. In addition, the controller 32 does not execute the frost formation judging of the outdoor heat exchanger 7 in a case where a vehicle speed noticeably varies. Therefore, the frost formation judging of the outdoor heat exchanger 7 can more precisely be realized so as to remove the wrong judgment which occurs when passing air through the outdoor heat exchanger 7 noticeably varies.

(7-4) Frost Formation Judging of Outdoor Heat Exchanger (No. 3)

Here, in the frost formation judging of each of the above embodiments, the refrigerant evaporation pressure PXObase or the refrigerant evaporation temperature TXObase during the non-frost formation is calculated from each of the above parameters at the moment, but the present invention is not limited. Furthermore, the refrigerant evaporation pressure PCObase of the outdoor heat exchanger 7 during the non-frost formation or the refrigerant evaporation temperature TXObase of the outdoor heat exchanger 7 during the non-frost formation may be determined beforehand, on the basis of an efficiency of the outdoor heat exchanger 7 during refrigerant evaporation, or the refrigerant evaporation pressure of the outdoor heat exchanger 7 at low humidity, or the refrigerant evaporation temperature of the outdoor heat exchanger 7 at the low humidity, the pressure or the temperature may be stored in the controller 32, and the difference ΔPXO from the refrigerant evaporation pressure PXO at the moment or the difference ΔTXO from TXO at the moment may be calculated.

It is to be noted that in the embodiment, the present invention is applied to the vehicle air conditioner 1 which changes and executes the respective operation modes of the heating mode, the dehumidifying and heating mode, the dehumidifying and cooling mode, and the cooling mode, but the present invention is not limited to the embodiment, and the present invention is also effective for a vehicle air conditioner which only executes the heating mode in the invention of claim 1 and also for a vehicle air conditioner which only executes the dehumidifying and heating mode in the invention of claim 2.

Additionally, in the embodiment, the high-temperature refrigerant gas is allowed to flow through the outdoor heat exchanger 7, thereby performing the defrosting, but the defrosting means is not limited to the embodiment, and the present invention is also effective for a vehicle air conditioner which performs the defrosting by an electric heater or the like, or simply by passing air.

Furthermore, the constitution of the refrigerant circuit R and the respective numeric values described in the above embodiment are not limited, and are, needless to say, changeable without departing from the gist of the present invention.

DESCRIPTION OF REFERENCE NUMERALS 1 vehicle air conditioner
2 compressor
3 air flow passage
4 radiator
6 outdoor expansion valve
7 outdoor heat exchanger
8 indoor expansion valve
9 heat absorber
11 evaporation capability control valve
17, 21 and 22 solenoid valve
23 solenoid valve (defrosting means)
26 suction changing damper
27 indoor blower (a blower fan)
28 air mix damper
32 controller (control means)
R refrigerant circuit

The invention claimed is:

1. A vehicle air conditioner comprising:
a compressor which compresses a refrigerant;
an air flow passage through which air to be supplied into a vehicle interior flows;
a radiator disposed in the air flow passage to let the refrigerant radiate heat;
an outdoor heat exchanger disposed outside the vehicle interior to let the refrigerant absorb heat;
defrosting means for performing defrosting of the outdoor heat exchanger; and
control means being configured to let the refrigerant discharged from the compressor radiate heat in the radiator, decompress the refrigerant by which heat has been radiated, and then let the refrigerant absorb heat in the outdoor heat exchanger, thereby heating in the vehicle interior;
wherein the control means judges frost formation onto the outdoor heat exchanger on the basis of a refrigerant evaporation pressure PXO of the outdoor heat exchanger and a refrigerant evaporation pressure PXObase of the outdoor heat exchanger during non-frost formation or on the basis of a refrigerant evaporation temperature TXO of the outdoor heat exchanger and a refrigerant evaporation temperature TXObase of the outdoor heat exchanger during the non-frost formation, and performs the defrosting of the outdoor heat exchanger by the defrosting means.

2. The vehicle air conditioner according to claim 1, wherein the control means determines the refrigerant evaporation pressure PXObase of the outdoor heat exchanger during the non-frost formation or the refrigerant evaporation temperature TXObase of the outdoor heat exchanger during the non-frost formation on the basis of at least one or any combination of indexes indicating a suction air temperature of the outdoor heat exchanger, a passing air speed of the outdoor heat exchanger, a refrigerant flow rate, a passing air volume of the radiator, and a load.

3. The vehicle air conditioner according to claim 1, wherein the refrigerant evaporation pressure PCObase of the outdoor heat exchanger during the non-frost formation or the refrigerant evaporation temperature TXObase of the outdoor heat exchanger during the non-frost formation is determined on the basis of an efficiency of the outdoor heat exchanger during refrigerant evaporation, the refrigerant evaporation pressure of the outdoor heat exchanger at low humidity, or the refrigerant evaporation temperature of the outdoor heat exchanger at the low humidity.

4. The vehicle air conditioner according to claim 3, wherein the refrigerant evaporation pressure PCObase of the outdoor heat exchanger during the non-frost formation or the refrigerant evaporation temperature TXObase of the outdoor heat exchanger during the non-frost formation is determined on the basis of an efficiency of the outdoor heat exchanger during refrigerant evaporation, the refrigerant evaporation pressure of the outdoor heat exchanger at low humidity, or the refrigerant evaporation temperature of the outdoor heat exchanger at the low humidity.

5. The vehicle air conditioner according to claim 1, wherein the control means judges that the frost is formed in the outdoor heat exchanger, when there is continued for a predetermined time a state where the refrigerant evaporation pressure PXO of the outdoor heat exchanger is lower than the refrigerant evaporation pressure PXObase of the outdoor heat exchanger during the non-frost formation and a difference $\Delta$PXO is a predetermined value or more, or when there is continued for a predetermined time a state where the refrigerant evaporation temperature TXO of the outdoor heat exchanger is lower than the refrigerant evaporation temperature TXObase of the outdoor heat exchanger during the non-frost formation and a difference $\Delta$TXO is a predetermined value or more.

6. The vehicle air conditioner according to claim 5, wherein the control means changes the predetermined value of the difference $\Delta$PXO of the frost formation judging and/or a predetermined time of the frost formation judging, or the predetermined value of the difference $\Delta$TXO of the frost formation judging and/or a predetermined time of the frost formation judging on the basis of at least one or any combination of indexes indicating an environmental condition, the load, and aging deterioration.

7. The vehicle air conditioner according to claim 1, wherein the control means does not execute the frost formation judging of the outdoor heat exchanger in a transition period of an operating status.

8. The vehicle air conditioner according to claim 1, wherein the control means does not execute the frost formation judging of the outdoor heat exchanger in a case where a vehicle speed noticeably varies.

9. A vehicle air conditioner comprising:
a compressor which compresses a refrigerant;
an air flow passage through which air to be supplied into a vehicle interior flows;
a radiator disposed in the air flow passage to let the refrigerant radiate heat;
an outdoor heat exchanger disposed outside the vehicle interior to let the refrigerant absorb heat;
defrosting means for performing defrosting of the outdoor heat exchanger; and
control means being configured to let the refrigerant discharged from the compressor radiate heat in the radiator, decompress the refrigerant by which heat has been radiated, and then let the refrigerant absorb heat only in a heat absorber or in the heat absorber and the outdoor heat exchanger, thereby dehumidifying and heating in the vehicle interior,
wherein the control means judges frost formation onto the outdoor heat exchanger on the basis of a refrigerant evaporation pressure PXO of the outdoor heat exchanger and a refrigerant evaporation pressure PXObase of the outdoor heat exchanger during non-frost formation or on the basis of a refrigerant evaporation temperature TXO of the outdoor heat exchanger and a refrigerant evaporation temperature TXObase of the outdoor heat exchanger during the non-frost formation, and performs the defrosting of the outdoor heat exchanger by the defrosting means.

10. The vehicle air conditioner according to claim 9, wherein the control means determines the refrigerant evaporation pressure PXObase of the outdoor heat exchanger during the non-frost formation or the refrigerant evaporation temperature TXObase of the outdoor heat exchanger during the non-frost formation on the basis of at least one or any combination of indexes indicating a suction air temperature of the outdoor heat exchanger, a passing air speed of the outdoor heat exchanger, a refrigerant flow rate, a passing air volume of the radiator, and a load.

11. The vehicle air conditioner according to claim 9, wherein the refrigerant evaporation pressure PCObase of the outdoor heat exchanger during the non-frost formation or the refrigerant evaporation temperature TXObase of the outdoor heat exchanger during the non-frost formation is determined on the basis of an efficiency of the outdoor heat exchanger during refrigerant evaporation, the refrigerant evaporation pressure of the outdoor heat exchanger at low humidity, or the refrigerant evaporation temperature of the outdoor heat exchanger at the low humidity.

12. The vehicle air conditioner according to claim 9, wherein the control means judges that the frost is formed in the outdoor heat exchanger, when there is continued for a predetermined time a state where the refrigerant evaporation pressure PXO of the outdoor heat exchanger is lower than the refrigerant evaporation pressure PXObase of the outdoor heat exchanger during the non-frost formation and a difference $\Delta$PXO is a predetermined value or more, or when there is continued for a predetermined time a state where the refrigerant evaporation temperature TXO of the outdoor heat exchanger is lower than the refrigerant evaporation temperature TXObase of the outdoor heat exchanger during the non-frost formation and a difference $\Delta$TXO is a predetermined value or more.

13. The vehicle air conditioner according to claim 12, wherein the control means changes the predetermined value of the difference $\Delta$PXO of the frost formation judging and/or a predetermined time of the frost formation judging, or the predetermined value of the difference $\Delta$TXO of the frost formation judging and/or a predetermined time of the frost formation judging on the basis of at least one or any combination of indexes indicating an environmental condition, the load, and aging deterioration.

14. The vehicle air conditioner according to claim 9,
wherein the control means does not execute the frost formation judging of the outdoor heat exchanger in a transition period of an operating status.

15. The vehicle air conditioner according to claim 9,
wherein the control means does not execute the frost formation judging of the outdoor heat exchanger in a case where a vehicle speed noticeably varies.

16. A vehicle air conditioner comprising:
a compressor which compresses a refrigerant;
an air flow passage through which air to be supplied into a vehicle interior flows;
a radiator disposed in the air flow passage to let the refrigerant radiate heat;
a heat absorber disposed in the air flow passage to let the refrigerant absorb heat;
an outdoor heat exchanger disposed outside the vehicle interior to let the refrigerant radiate or absorb heat;
defrosting means for performing defrosting of the outdoor heat exchanger; and
control means being configured to change and execute at least one of:
a heating mode in which the refrigerant discharged from the compressor radiates heat in the radiator, and the refrigerant by which heat has been radiated is decompressed and then absorbs heat in the outdoor heat exchanger;
a dehumidifying and heating mode in which the refrigerant discharged from the compressor radiates heat in the radiator, and the refrigerant by which heat has been radiated is decompressed and then absorbs heat only in the heat absorber or in the heat absorber and the outdoor heat exchanger;
a dehumidifying and cooling mode in which the refrigerant discharged from the compressor radiates heat in the radiator and the outdoor heat exchanger, and the refrigerant by which heat has been radiated is decompressed and then absorbs heat in the heat absorber; and
a cooling mode in which the refrigerant discharged from the compressor radiates heat in the outdoor heat exchanger, and the refrigerant by which heat has been radiated is decompressed and then absorbs heat in the heat absorber,
wherein in the heating mode and the dehumidifying and heating mode, the control means judges frost formation onto the outdoor heat exchanger on the basis of a refrigerant evaporation pressure PXO of the outdoor heat exchanger and a refrigerant evaporation pressure PXObase of the outdoor heat exchanger during non-frost formation or on the basis of a refrigerant evaporation temperature TXO of the outdoor heat exchanger and a refrigerant evaporation temperature TXObase of the outdoor heat exchanger during the non-frost formation, and performs the defrosting of the outdoor heat exchanger by the defrosting means.

17. The vehicle air conditioner according to claim 16
wherein the control means determines the refrigerant evaporation pressure PXObase of the outdoor heat exchanger during the non-frost formation or the refrigerant evaporation temperature TXObase of the outdoor heat exchanger during the non-frost formation on the basis of at least one or any combination of indexes indicating a suction air temperature of the outdoor heat exchanger, a passing air speed of the outdoor heat exchanger, a refrigerant flow rate, a passing air volume of the radiator, and a load.

18. The vehicle air conditioner according to claim 16,
wherein the control means judges that the frost is formed in the outdoor heat exchanger, when there is continued for a predetermined time a state where the refrigerant evaporation pressure PXO of the outdoor heat exchanger is lower than the refrigerant evaporation pressure PXObase of the outdoor heat exchanger during the non-frost formation and a difference $\Delta$PXO is a predetermined value or more, or when there is continued for a predetermined time a state where the refrigerant evaporation temperature TXO of the outdoor heat exchanger is lower than the refrigerant evaporation temperature TXObase of the outdoor heat exchanger during the non-frost formation and a difference $\Delta$TXO is a predetermined value or more.

19. The vehicle air conditioner according to claim 18,
wherein the control means changes the predetermined value of the difference $\Delta$PXO of the frost formation judging and/or a predetermined time of the frost formation judging, or the predetermined value of the difference $\Delta$TXO of the frost formation judging and/or a predetermined time of the frost formation judging on the basis of at least one or any combination of indexes indicating an environmental condition, the load, and aging deterioration.

20. The vehicle air conditioner according to claim 16,
wherein the control means does not execute the frost formation judging of the outdoor heat exchanger in a transition period of an operating status.

* * * * *